J. ANDERSON.
VEHICLE AXLE.
APPLICATION FILED FEB. 21, 1916.
1,203,957.
Patented Nov. 7, 1916.
2 SHEETS—SHEET 1.
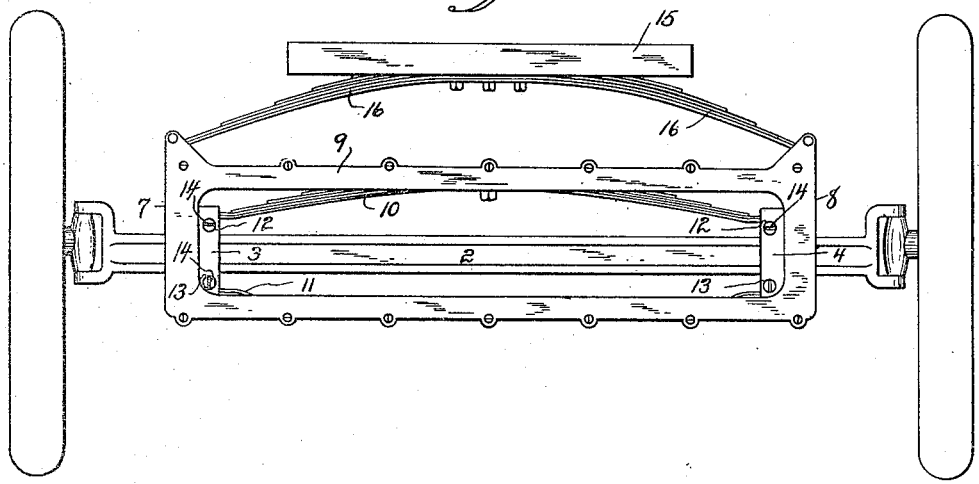
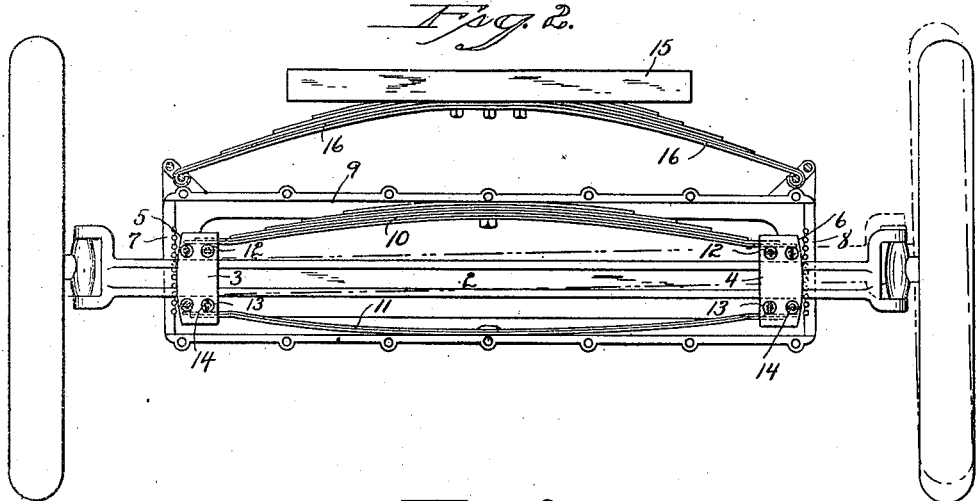
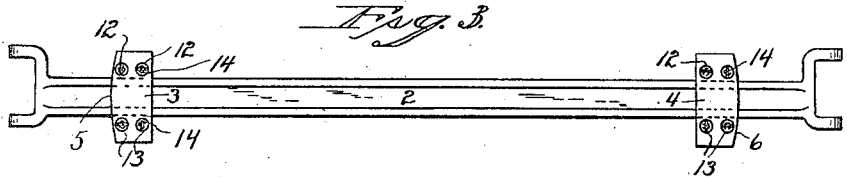

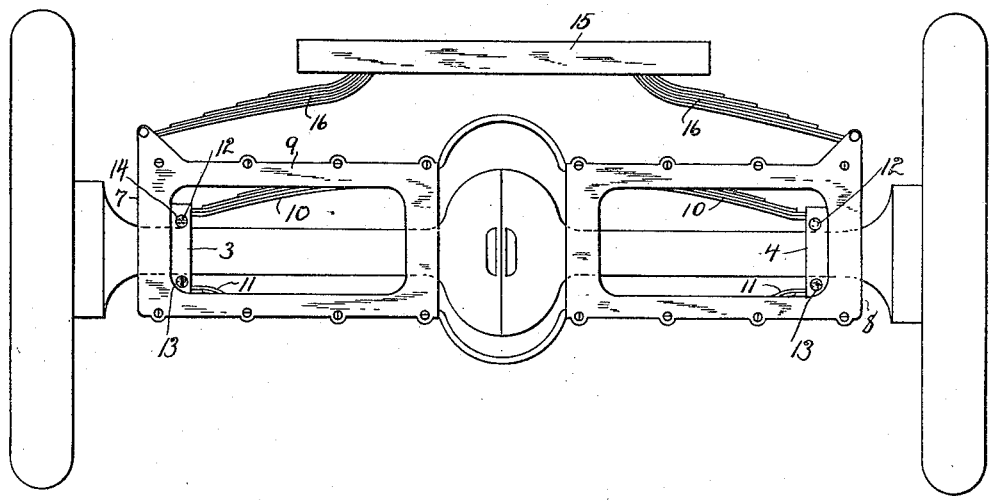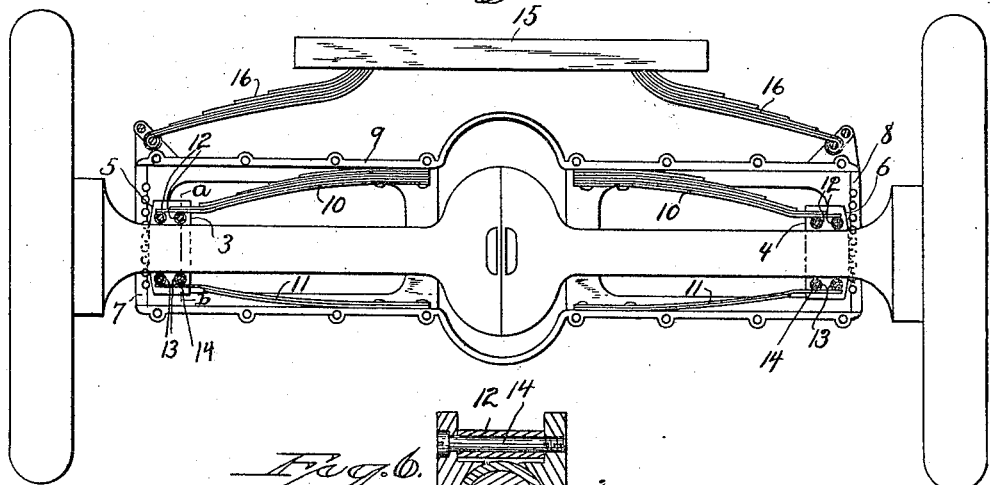

UNITED STATES PATENT OFFICE.

JOHN ANDERSON, OF PORTLAND, CONNECTICUT.

VEHICLE-AXLE.

1,203,957.  Specification of Letters Patent.  Patented Nov. 7, 1916.

Application filed February 21, 1916. Serial No. 79,566.

*To all whom it may concern:*

Be it known that I, JOHN ANDERSON, a citizen of the United States, residing at Portland, in the county of Middlesex and State of Connecticut, have invented a new and useful Improvement in Vehicle-Axles; and I do hereby declare the following, when taken in connection with the accompanying drawings and the characters of reference marked thereon, to be a full, clear, and exact description of the same, and which said drawings constitute part of this application, and represent, in—

Figure 1 a front view of a vehicle axle constructed in accordance with my invention. Fig. 2 a similar view with the front of the axle box removed. Fig. 3 a front view of the axle showing the blocks mounted thereon and removed from the axle box. Fig. 4 a rear view of the rear axle embodying my invention. Fig. 5 a similar view with the rear wall of the rear axle box removed. Fig. 6 a sectional view on the line a—b of Fig. 5.

This invention relates to an improvement in vehicle axles particularly adapted for motor vehicles, the object being to mount the axle casing so that the axle may be moved without moving the vehicle, acting to a certain extent as a shock absorber and permitting the use of solid tire wheels with the same effect as the pneumatic tires; and the invention consists in certain details of construction as will be hereinafter described and particularly recited in the claims.

In carrying out my invention I employ the usual front axle 2 to which I apply blocks 3, 4, near opposite ends, and form the outer edges of these blocks with cam surfaces 5, 6, respectively adapted to co-act with the end walls 7 and 8 of an axle housing 9 through which the axle extends, the housing being formed at its ends with slots to permit the vertical movement of the axle. The cam surfaces 5 and 6 are so shaped that if either end of the axle is raised or lowered, the blocks will always have a close contact with the end walls 7 and 8 of the housing so as to prevent lateral play. Between the top of the housing and the axle I arrange a spring 10, and between the lower wall of the housing and the axle I place a spring 11. Preferably and as shown, the ends of these springs rest on rollers 12, 13, mounted above and below the axle in the blocks 5 and 6, and held in place by the bolts 14 by which the sections of the block are clamped to the axle. The chassis or vehicle body 15 is mounted upon the top of the axle housing and is generally provided with the usual springs 16. The housing for the rear axle as shown in Figs. 4 and 5 of the drawings is substantially the same as for the front axle shown in Figs. 1 and 2 of the drawings except provision is made at the center for the clearance of the transmission gearing; and in this case the springs 10 and 11 instead of extending from end to end of the housing are divided at the center, the effect being the same in either case of permitting either end of the axle to be moved up or down. Preferably and as indicated in Figs. 2 and 5 of the drawings, roller bearings will be provided at the ends of the housing for the thrust of the blocks 5 and 6.

I claim:—

1. The combination with a vehicle axle, of blocks secured near opposite ends thereof, a housing through which the axle extends and in which it is permitted to have vertical movement, the said blocks bearing against the opposite end walls of the said housing.

2. The combination with a vehicle axle, of blocks secured near opposite ends thereof, the outer faces of said blocks formed with cam surfaces, combined with a housing through which the axle extends and in which it is permitted to have vertical movement the cam edges of the blocks engaging with the end walls of the housing.

3. The combination with a vehicle axle, of blocks secured near opposite ends thereof, a housing through which the axle extends and in which it has vertical movement, anti-friction rollers mounted in the end walls of the housing and against which the outer faces of the blocks engage.

4. The combination with a vehicle axle, of blocks secured near opposite ends thereof, a housing through which the axle extends, the outer faces of the blocks adapted to engage with the end walls of the housing, and a spring interposed between the upper surface of the axle and the top of the housing.

5. The combination with a vehicle axle, of blocks secured near opposite ends thereof, a housing through which the axle extends, the outer faces of the blocks adapted to engage with the end walls of the housing, and a spring interposed between the under surfaces of the axle and the bottom of the housing.

6. The combination with a vehicle axle, of blocks secured near opposite ends thereof, a housing through which the axle extends, the blocks adapted to engage with the end walls of the housing, friction-rollers mounted in the upper ends of said blocks, a spring between the top of the axle and the top of the housing, the ends of said springs resting on the roller bearings in the blocks.

7. The combination with a vehicle axle, of blocks mounted thereon near opposite ends, anti-friction rollers mounted in the upper and lower ends of said blocks, a housing through which the axle extends and in which it is permitted to have vertical movement, springs arranged between the top of the axle and the top of the box and between the bottom of the axle and the bottom of the box, the ends of said springs bearing on the rollers mounted in the blocks.

JOHN ANDERSON.

Copies of this patent may be obtained for five cents each, by addressing the "Commissioner of Patents, Washington, D. C."